(12) United States Patent
Wrasman et al.

(10) Patent No.: US 6,975,228 B2
(45) Date of Patent: Dec. 13, 2005

(54) DUAL MODE RFID DEVICE

(75) Inventors: Duane Wrasman, Albuquerque, NM (US); Wesley M. Mays, Coppell, TX (US)

(73) Assignee: TC (Bermuda) License, Ltd., Hamilton (BM)

( * ) Notice: Subject to any disclaimer, the term of this patent is extended or adjusted under 35 U.S.C. 154(b) by 59 days.

(21) Appl. No.: 09/836,672

(22) Filed: Apr. 16, 2001

(65) Prior Publication Data

US 2002/0043559 A1 Apr. 18, 2002

Related U.S. Application Data

(60) Provisional application No. 60/197,763, filed on Apr. 17, 2000.

(51) Int. Cl.$^7$ .............................................. G08B 13/14
(52) U.S. Cl. ............................... 340/572.1; 340/572.4; 340/572.8; 340/10.34; 340/825.56
(58) Field of Search ........................ 340/572.1, 572.4, 340/572.8, 572.9, 10.34, 10.4, 10.41, 10.42, 340/10.51, 10.52, 825.56, 825.69

(56) References Cited

U.S. PATENT DOCUMENTS

| | | | | |
|---|---|---|---|---|
| 3,974,452 A | * | 8/1976 | Cunningham | 455/154.2 |
| 4,739,328 A | * | 4/1988 | Koelle et al. | 342/44 |
| 4,816,839 A | * | 3/1989 | Landt | 343/795 |
| 5,030,807 A | * | 7/1991 | Landt et al. | 235/375 |
| 5,649,295 A | * | 7/1997 | Shober et al. | 340/10.1 |
| 6,078,251 A | * | 6/2000 | Landt et al. | 340/10.41 |
| 6,336,126 B1 | * | 1/2002 | Bjorklund et al. | 708/139 |
| 6,354,493 B1 | * | 3/2002 | Mon | 235/385 |

* cited by examiner

Primary Examiner—Jeffrey Mofsass
Assistant Examiner—Daniel Previl
(74) Attorney, Agent, or Firm—Blank Rome LLP

(57) ABSTRACT

An RFID reader with dual mode capability. A digital signal processor controls an RF source and preamplifier module according to programmed RFID protocols. RF signals received are decoded and transmitted to a host computer. RFID protocols usable with the reader include Intellitag 500 and ISO/AAR.

14 Claims, 1 Drawing Sheet

DUAL MODE RFID DEVICE

This application claims the benefit of U.S. Provisional Application No. 60/197,763 filed Apr. 17, 2000.

BACKGROUND OF THE INVENTION

1. Field of the Invention

The present invention relates in general to an RFID reader and in particular to a RFID reader with a capability to read different formats of RFID tags, including Intellitag "Gamma" and ISO/AAR RFID protocols.

2. Description of Related Art

An RFID reader broadcasts RF energy over an adjustable area called a read zone or reader footprint. An RFID tag, for example on a vehicle or package, reflects a small part of the RF energy back to the antenna of the reader. The reflected radio waves modify depending upon data stored on the RFID tag. The reader detects the modified radio waves and is able to decode the unique identification code or stored data located on the RFID. The technology for reading and alternatively writing data from and into a remote RFID is described in detail in U.S. Pat. Nos. 4,739,328; 4,782,345; 4,786,906; 4,816,839; 4,835,377; 4,853,705; 4,739,328 and 5,030,807 all hereby incorporated by reference. Previous readers have been able to read variations of the ISO/AAR protocol (International Organization for Standardization 10374.2 standard for intermodal freight containers/Association for American Railroads S-918 mandated standard for automatic equipment identification). A newer form of RFID tag utilizes "Gamma" technology. Representative of this form of RFID format is the Intellitag 500. In contrast with previous ISO/AAR formats the Intellitag 500 for Gamma technology RFID utilizes a differently modulated RF signal created by driving series RF mixers in the RF source section of the RFID reader transmitter. The Intellitag 500 format RFID being easier and cheaper to manufacture, it is expected to have an increasing market share. However, a large number of existing ISO/AAR format RFIDs are already in use.

Therefore, it is object of the present invention to create an RFID reader capable of reading both ISO/AAR format and Intellitag 500 (Gamma) RFIDs.

SUMMARY OF THE INVENTION

The present invention has the capability of reading Intellitag 500 and existing ISO/AAR format RFIDs. To create a modulated signal for use with both the ISO/AAR and Intellitag 500 RFID Protocols, RF mixers in series in the RF source section are used. The modulation data string is controlled by logic signals eminating from a digital signal processor. In the Receiving portion of the RF/preamplifier module, a preamplifier has variable gain controlled by the processor in response to the amplitude of incoming data. A PLL synthesizer is under the control of the digital signal processor which also monitors for error conditions to determine whether or not the PLL has "lost lock". A variety of options are integrateable into the device via a user configurable FLASH memory.

BRIEF DESCRIPTION OF THE DRAWINGS

As shown in FIG. 1, the device comprises and antenna connected to a RF/preamp module linked to a power supply which has connections to a digital signal processor module and various I/O protocols including RS232, RS422, RS485 and wiegand.

As shown in FIG. 2, the blocks making up the device are inter related by a variety of signals and power supply connections. Individual voltages are generated by the power supply matching the requirements of the various electrical circuits in the blocks and submodules.

As shown in FIG. 3, the RF source section 300 includes RF mixers 302 in senes.

Figure 1:
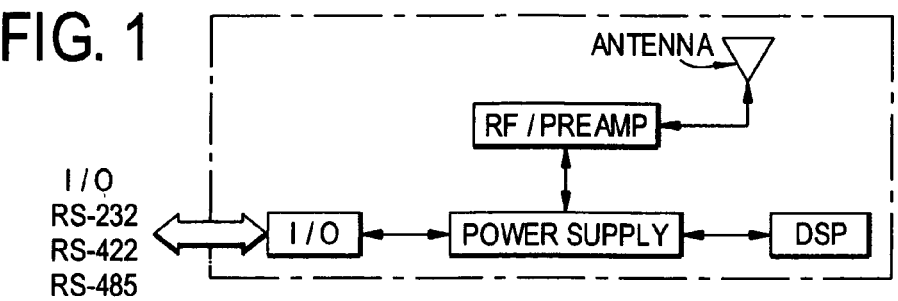
FIG. 1 is a block diagram of the present invention.
Figure 2:
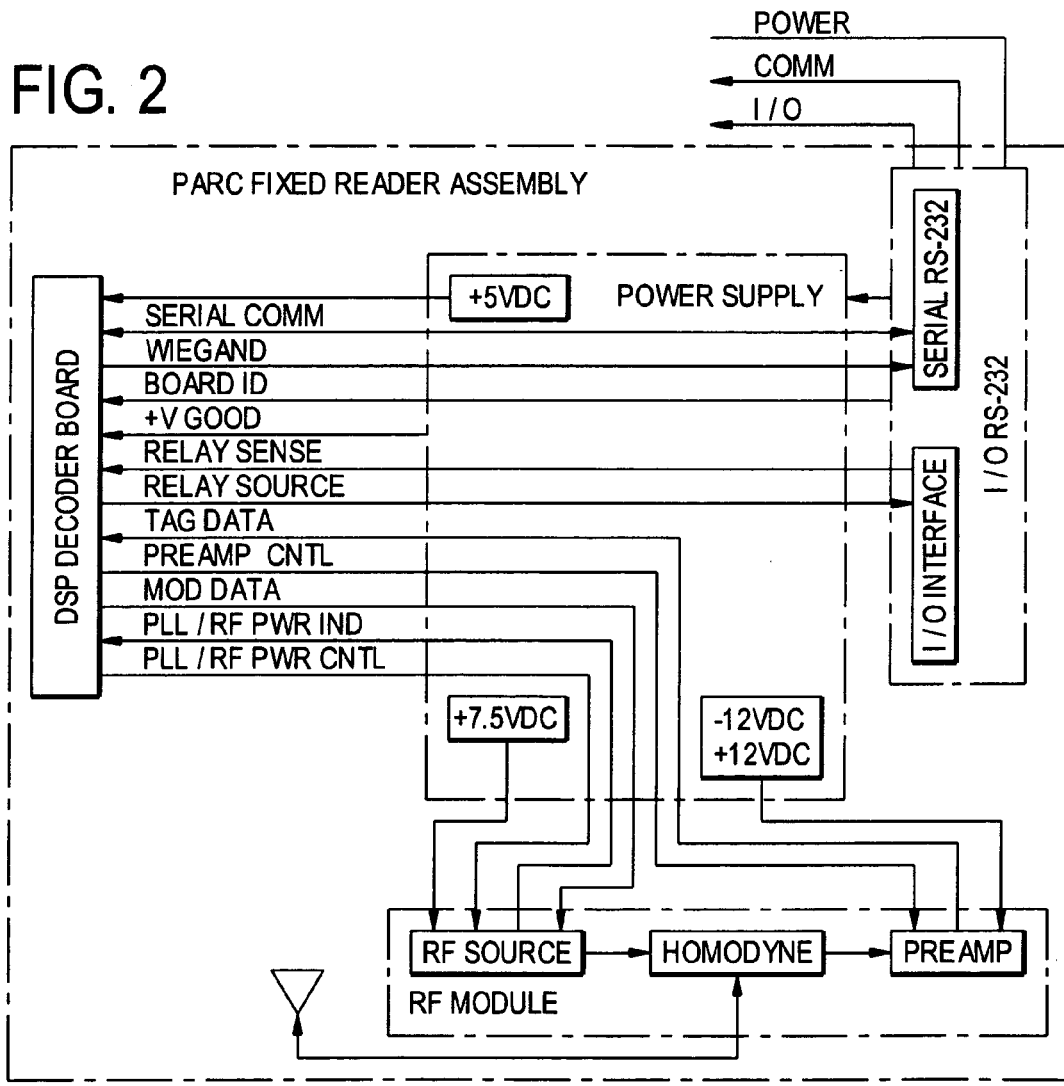
FIG. 2 is a block diagram of the present invention showing internal signal, control and power connections between the different blocks.
Figure 3:
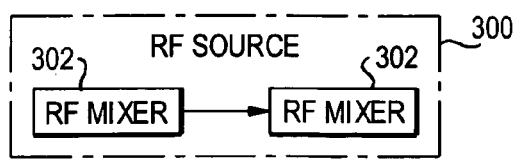
FIG. 3 is a block diagram of the RF source section of the preferred embodiment.

The antenna may be a linearly polarized four patch circular array. The antenna is interconnected with the homodyne in the RF/preamp block. The homodyne mixes a portion of the outgoing transmitter signal with the incoming tag signal resulting in a direct conversion of the tag signal to baseband.

Diodes in the homodyne are spaced to provide constant tag signal data. Received signals are transmitted from the homodyne to the preamplifier. The preamplifier utilizes a two-channel amplifier (1 channel and Q channels), that provides for filtering and amplification of the received tag signal. The tag signal is amplified by approximately 60 dB and is filtered to insure maximum signal fidelity for the Digital Signal Processor (DSP).

The gain of the amplifier is variable and may be controlled by the processor in response to the amplitude of the incoming data. The transmitter portion of the RF/preamplifier is a RF source. The RF source utilizes a single phase-lock-loop (PLL) frequency source connected to a series of amplifiers. The PLL synthesizer chip is programmable under the control of the DSP. The DSP monitors for error conditions to determine if the PLL has "lost lock". If a "lost lock" occurs, the RF output is turned off by the DSP. At full power, the output power of the RF source may be approximately 2 watts. The output power of the RF source being programmable by the DSP.

The DSP module includes a digital signal processor for decoding of data, communications interfacing, application operation, I/O sensing transmission and overall device control. The DSP also controls the RF module as described herein above. The DSP contains both serial EEPROM and FLASH memory. The serial EEPROM is used for storing permanent parameters while the FLASH memory holds application software as well as a UART with built in FIFO. The DSP is designed to address up to 64K of external data and up to 64K of external program memory. The DSP controller may use a 16-bit address bus to access external RAM, FLASH memory and memory mapped I/O ports.

A boot code is stored in the top page of FLASH memory. The boot code is 16 bits wide and is used for facilitating systems startup and supplies utilities to erase and program new application code from the serial port while connected to a host computer. The boot code is also responsible for moving FLASH application code to RAM for execution. Application code is stored in the same FLASH memory as the boot code. During normal operation this memory area is read only application program space. The application code may be erased and reprogrammed with new application code. To reprogram the application code, program control is transferred to the boot code. The boot code determines if a valid application is present and if not will go into a download mode. While in download mode, the boot code may issue erase and program commands by writing to the FLASH memory.

The device's read range may be adjusted by the user in two separate ways. The first method is via adjustment of valid data threshold levels set in software, thus varying the read range of the system. A user, using host software, has the capability to modify the data threshold level. The range adjustment is accomplished by increasing or decreasing the effective receiver sensitivity by changing the window of the valid A/D samples that are used when decoding tag data. The second method for adjusting the read range of the reader is by varying the RF power output by the reader. The user may decrease the RF output power up to 10 dB from a full power setting.

The mechanical configuration of the device is such that the unit may utilize the housing of the previous generation of RFID readers. The housing is composed of two halves, the radome and base elements which are mirror images of each other The two halves snap together producing a structurally sound package of minimum materials cost. The housing may be formed from, for example, polycarbonate material. Internal hardware utilizes direct connections to reduce costs, assembly time and improve reliability.

The present invention is entitled to a range of equivalence, and is to be limited only by the scope of the following claims.

What is claimed is:

1. A dual mode RFID reader, comprising:
an antenna for receiving and transmitting RF signals,
a RF source and Preamplifier module having a RF source section comprising at least two RF mixers in series and a preamplifier section,
a power supply,
an input/output connection, and
a digital signal processor module;
said antenna connected to said RF source and preamplifier module for receiving and transmitting RF signals:
said digital signal processor module controlling said RF source and preamplifier module, and decoding said RF signals received by the antenna;
said digital signal processor operable with more than one of a RFID protocol by changing an operational characteristic of said RF source and preamplifier module, wherein the gain of the preamplifier is adjusted in response to the amplitude of the incoming data.

2. The device of claim 1, wherein:
said Digital signal processor includes a flash memory,
said flash memory loadable with operational data, allowing the device to be reconfigured by a host computer.

3. The device of claim 1, wherein:
said more than one RFID protocols include Intellitag 500 and ISO/AAR protocol.

4. The device of claim 1 wherein:
An operating range of the device is adjustable by varying a RF signal power output level.

5. The device of claim 1 wherein:
An operating range of the device is adjustable by varying a data threshold level.

6. The device of claim 1 wherein:
the device is enclosed in a housing formed from two identical, matching halves.

7. The device of claim 1 wherein:
the RF source and preamplifier module filter and amplify received RF signals at a filtering and amplification level controlled by the digital signal processor.

8. The device of claim 1 wherein a modulation data string is controlled by logic signals from the data signal processor.

9. The device of claim 1 wherein said more than one RFID protocol is at least a first RFID protocol and a second RFID protocol and said first RFID protocol utilizes gamma technology.

10. The device of claim 1 wherein said more than one RFID protocol is at least a first RFID protocol and a second RFID protocol and said first RFID protocol utilizes a differently modulated RF signal than said second RFID protocol.

11. A method of reading more than one RFID protocol comprising the steps of:
driving RF mixers in series to create a modulated signal for use with more than one RFID protocol;
controlling the modulation data string;
adjusting the gain of a preamplifier in response to the amplitude of incoming data; and
monitoring for error conditions.

12. The method of claim 11 wherein said more than one RFID protocol is at least a first RFID protocol and a second RFID protocol and said first and second RFID protocols are Intellitag 500 and ISO/AAR protocol.

13. The method of claim 11 wherein said more than one RFID protocol is at least a first RFID protocol and a second RFID protocol and said first RFID protocol utilizes gamma technology.

14. The method of claim 11 wherein said more than one RFID protocol is at least a first RFID protocol and a second RFID protocol and said first RFID protocol utilizes a differently modulated RF signal than said second RFID protocol.

* * * * *